United States Patent

[11] 3,591,294

[72] Inventor Hugh G. Neil
       Knoxville, Tenn.
[21] Appl. No. 795,521
[22] Filed Jan. 31, 1969
[45] Patented July 6, 1971
[73] Assignee The University of Tennessee Research Corporation
       Knoxville, Tenn.

[54] FIBER MEASUREMENT
     26 Claims, 7 Drawing Figs.
[52] U.S. Cl. .................................................. 356/167,
                      73/159, 250/219 (S), 356/199
[51] Int. Cl. ............................................. G01b 11/04
[50] Field of Search ........................................ 250/219;
                      356/159—161, 167, 199, 242, 245; 73/159

[56]                 References Cited
              UNITED STATES PATENTS
2,299,983  10/1942  Hertel ........................... 356/167
2,648,251   8/1953  Puster ........................... 356/167
2,845,837   8/1958  Lord .............................. 250/219 (S)
3,039,303   6/1962  Reddick ......................... 73/159
3,065,664  11/1962  Hertel et al. ................. 250/219 (S)
3,088,035   4/1963  Neil ............................... 250/219 (S)
              FOREIGN PATENTS
797,489   10/1968  Canada ........................ 356/199
817,833    7/1959  Great Britain ................ 250/219 (S)
              OTHER REFERENCES
Ewald & Worley, Jr., "Converting The Fibrograph To Automatic Direct Reading Operation," TEXTILE RESEARCH JOURNAL, Vol. 31, pp. 602— 7, 7/61

Landstreet et al., "Automatic Data Acquisition Systems For Fiber And Yarn Testing," TEXTILE RESEARCH JOURNAL, Vol. 35, pp. 213— 7, 3/65.

Primary Examiner—Ronald L. Wibert
Assistant Examiner—J. Rothenberg
Attorney—Burns, Doane, Swecker and Mathis ABSTRACT: A fiber measurement system for making span length measurements on staple fiber samples. A random sample of parallelized staple fibers is gripped in a sample holder, the grip line being randomly located along the lengths of the fibers. The span length, defined as the distance of protrusion from this random grip line of a predetermined fractional part of the fibers in the sample, is determined by scanning the sample with a sensor such as a light source and detector. A reference measurement is taken with the scan line of the sensor positioned relatively near the grip line so as to be representative of the total number of fibers in the sample. The output of the sensor is a nonlinear function of the number of fibers at the scan line and is linearized by a nonlinear analog-to-digital converter. As the sample is scanned, the output of the analog-to-digital converter is compared to a predetermined fractional part of the reference measurement. During scanning, the relative motion between the sensor and the sample is accumulated. When the comparison indicates that the predetermined fractional part of the sample is at the scan line, the accumulated relative motion is recorded thereby providing the span length of that predetermined fractional part of the sample. In addition to actually measuring the span length, the system provides for setting and checking the accuracy of the light source plus checking to make sure that the fiber sample is within predetermined size limits.

INVENTOR
HUGH G. NEIL

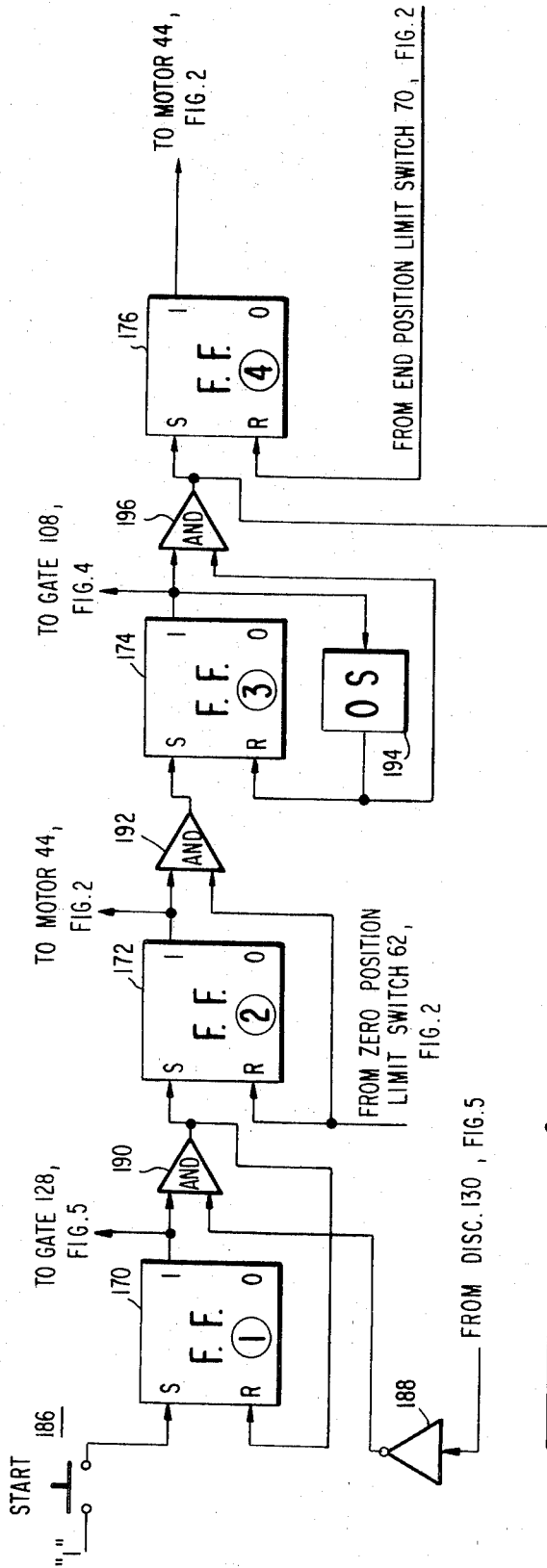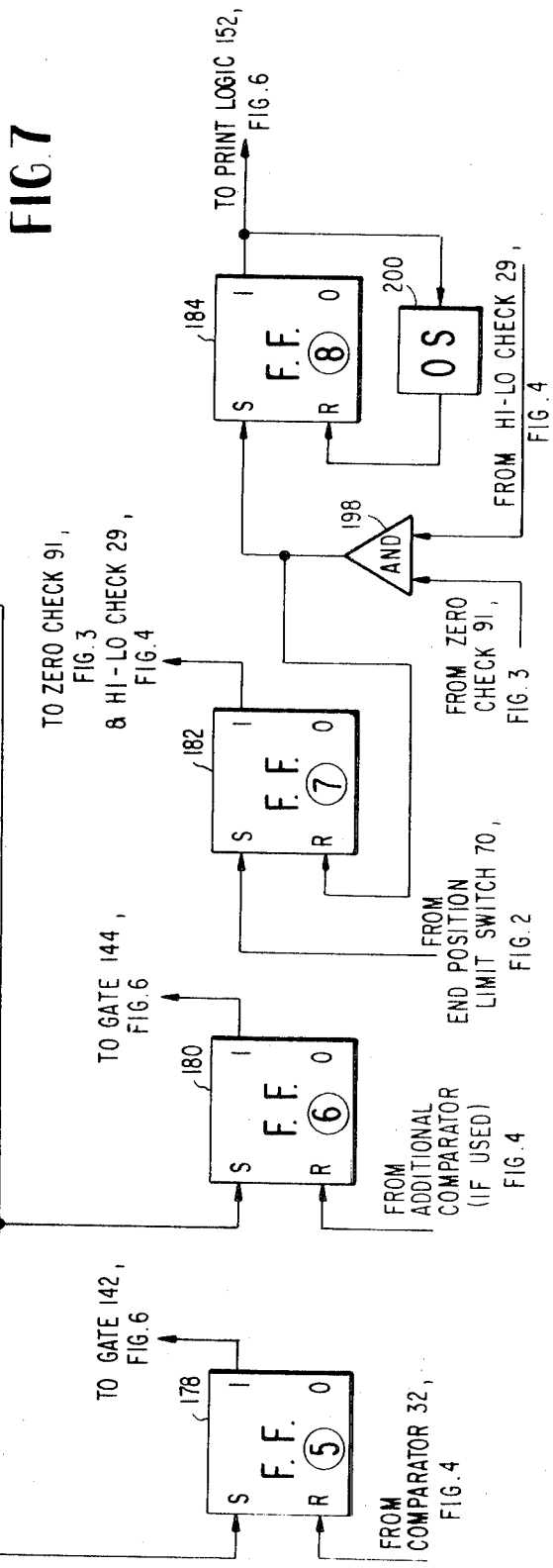
FIG. 7

FIBER MEASUREMENT

BACKGROUND OF THE INVENTION

The present invention relates to fiber measurement. More particularly, the invention relates to methods of and apparatus for making span length measurements on staple fiber samples.

The desirability of instrument measurements of fiber characteristics has long been recognized in the textile industry. Various properties, such as strength, color, fineness, etc. are important in evaluating fibers, but perhaps the most critical property of all as far as natural fibers, such as cotton fibers, are concerned, is fiber length.

One of the earliest steps in converting fiber length measurement from a manual art to a scientific approach is shown in U.S. Pat. No. 2,299,983 (1942) to Dr. K. L. Hertel. Dr. Hertel developed the fibrogram which is a graphical representation of the length characteristic fibers from a random sample of parallelized fibers. The fibrogram was generated by an optical measuring instrument which used the light transmission characteristics of a staple fiber sample as an indication of the number of fibers at any point along the length of the sample. By varying the point at which the fiber sample was scanned, the length characteristics of the fibers were determined. While the system disclosed by Dr. Hertel was a truly meaningful step in the automating of staple fiber measurement, the fibrogram itself took considerable time to generate and required interpretation in order to yield readily usable information.

A significant improvement over the system disclosed in the above-cited Hertel patent is shown in U.S. Pat. No. 3,065,664 (1962) to Hertel et al. In that system, numerical quantities were generated directly rather than be interpretation of curves as had been necessary with the original system shown by Hertel. Moreover, the numerical quantity generated proved to be an extraordinarily useful one. This quantity was span length, defined as the distance of protrusion from the grip line of a predetermined fractional part of the fibers caught at a grip line randomly located along the length of the fibers.

The system of the U.S. Pat. No. 3,065,664 utilized a light source for scanning a sample of parallelized staple fibers along a line at right angles to the fiber lengths and a light detector which indicated the amount of light passing through the fiber sample. As in the original Hertel system, the scan line was movable relative to the fiber sample so that the number of fibers at various points along the length of the sample might be determined. The first measurement made on any given sample was made very near the grip line to establish the size of that sample in terms of the value related approximately to the number of fibers in the gripped sample. This sample size indication was usually not recorded but served as a basis for establishing where further measurements were to be made. Each subsequent measurement was an evaluation of the distance of protrusion from the grip line of a predetermined fractional part of the measured number of fibers in the sample as a whole.

While the foregoing system had substantial advantages over the prior art discussed, there remained a need for further development of automatic fiber measuring instruments with emphasis on increasing the speed with which a fiber sample can be measured. As pointed out above, span length has been shown to be an extraordinarily valuable measure of fiber length which is an extremely important economic factor in cotton fibers. Ideally, every bale of cotton should be classified according to its span length, whereby providing valuable data which is important in both price and utilization of cotton fibers. However, such large scale measurement of cotton fibers was not previously economically feasible until the provision of a measuring instrument with the capability of performing accurate measurements at high speed.

In addition to increasing the speed with which such fiber measurements can be made, it was also necessary to make sure that the high speed measurements are accurate. The desire for accuracy, and automatic indication thereof, is enhanced when the relative speed of the measuring instrument is increased, since it is not feasible to rely on manual and/or visual methods of accuracy testing which would defeat the speed of measurement.

Error in high speed fiber measurement may result from either the measurement system itself or from irregularities in the fiber sample.

Therefore, in order to assure that the measurements taken are accurate, it is necessary to continuously check the operation of the measuring instrument and to verify that the fiber sample itself does not contain one of several possible irregularities.

One source of inaccuracies in the measuring instrument itself is the particular apparatus for sensing the fiber sample. For example, if the sensor is a radiation source and detector, the intensity of the radiation source is a critical factor in the accuracy of the measurements taken. Therefore, it is extremely important to insure that the radiation intensity is constant. Such assurances must be made, however, without adding appreciably to the total time spent in making measurements.

With respect to sample irregularities, it is clear that a fiber sample which is too small may not accurately reflect the characteristics of the fibrous body from which it was taken. In addition, there are generally certain upper limits with respect to the size of a fiber sample which the measuring instrument itself can accommodate. In measuring instruments which use some type of radiation for scanning the sample, the relationship between radiation transmission and the number of fibers depends, to a certain extent, upon the relative size of the sample being scanned. Finally, the fiber sample itself must be prepared to a certain extent before it can be accurately measured. While this preparation generally precludes the introduction of a sample having loose fibers which appear as hairy extensions of the sample, it is still necessary to assure that the particular sample being measured does not contain this type of irregularity. The sample must therefore be examined each time a fiber sample is measured and these examinations must necessarily take place quickly so as to prevent an undue increase in the overall time of measurement.

SUMMARY OF THE INVENTION

It is an object of the present invention to measure the span length of staple fiber samples with speeds and accuracies substantially exceeding that possible in the prior art.

It is a further object to insure the accuracy of such staple fiber measurements by periodic checks of the measuring instruments which do not add appreciably to the overall measuring time.

It is a still further object to insure measurement accuracy by examining the fiber sample itself so as to preclude errors which would result from the measurement of an irregular sample.

These and additional objects are accomplished by the present invention in which fiber measurements are made in a combined digital-analog measuring instrument which utilizes high speed digital logic components. The number of fibers in the sample is first sensed at some point very near the grip line so as to establish a reference measurement. Relative motion between the fiber sample and the sensor is then initiated so as to scan the fiber sample. While the sample is being scanned, the output of the sensor is compared with a fractional part of the reference measurement. When that fractional part of the measurement reference is at the scan line of the sensor, the total amount of such relative motion is recorded, thereby indicating the span length of that predetermined fractional part of the sample.

BRIEF DESCRIPTION OF THE DRAWINGS

A more complete understanding of the invention can be obtained by referring to the particular embodiment described below with reference to the accompanying drawings, in which.

DESCRIPTION OF THE PREFERRED EMBODIMENT

Figure 1:
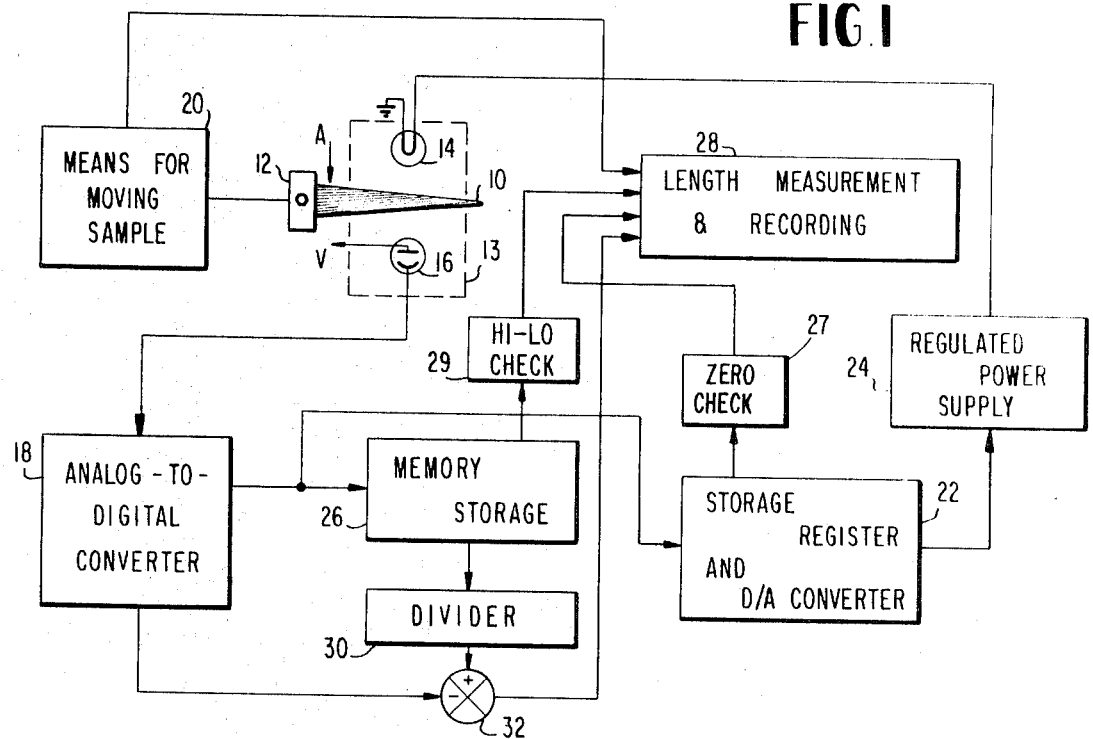
FIG. 1 is a block diagram of a fiber measurement system which comprises the preferred embodiment of the present invention.

The measuring instrument which forms the preferred embodiment of the present invention is shown in block diagram form in FIG. 1. A fiber sample 10 is held by a sample holder 12 preparatory to scanning by an appropriate type of scanner as shown generally at 13. The method of selecting and gripping the fiber sample is important since it has a definite effect on the data which results from measurement. First, a fiber sample is randomly selected from a quantity of staple fibers such as a bale of cotton. The fiber sample is prepared for measurement by combing, etc. so as to remove loose fibers and parallelize the remaining gripped fibers. The grip line of the sample holder 12 need have no special orientation with respect to the ends of the fibers in the sample. As defined hereinbefore, span length contemplates measurements taken with respect to a random grip line.

When the fiber sample is placed in the appropriate position in the measuring instrument, the scanner 13 will examine a transverse cross section of the sample. This cross section is known as the scan line. At any position of the fiber sample, scanner 13 will examine a transverse cross section of the sample. This cross section is known as the scan line. At any position of the fiber sample, scanner 13 will generate an analog voltage signal which is proportional to the number of fibers at the scan line. Scanner 13 may comprise, for example, a radiation source such as the light source 14 whose rays pass through the fiber sample 10 and then impinge upon a radiation detector such as the photocell 16.

Alternatively, scanner 13 might comprise a vacuum or pressure chamber in which air, as opposed to radiation energy, is used to scan the sample. The sample would then be inserted into an orifice in the chamber and a pressure transducer mounted inside the chamber would be used to indicate the pressure and therefore the sample size. The output of the pressure transducer would then provide the same type of indication as the radiation detector although its relationship to the number of fibers would be a somewhat different mathematical function.

The output of the scanner 13 is fed to an analog-to-digital converter 18. The purpose of analog-to-digital converter 18 is to convert the output of the scanner 13 to a digital number which represents the number of fibers at the scan line. A preferred embodiment of the analog-to-digital converter 18 is described in detail in conjunction with FIG. 3. For the present, it suffices to say that analog-to-digital hybrid 18 is a high speed, hybrid digital-analog device which operates to continuously convert the analog voltage output of the scanner 13 to a digital number.

The output of analog-to-digital converter 18 forms the input to a memory storage 26. The function or memory storage 26 is to record the contents of analog-to-digital converter 18 when the fiber sample 10 is at a predetermined position referred to hereinafter as the zero position. Subsequent measurements are all normalized in relation to the measurement taken at this zero position.

It will be evident that the actual location of the zero position is of some importance in evaluating the data taken. As defined, span length relates to a predetermined percentage of the number of fibers at the grip line. Thus, it would be desirable to establish the zero position very near, or at, the grip line. For physical reasons, it is not totally practical to establish the zero position precisely at the grip line. It has therefore become standard practice to establish the zero position at a point sufficiently near the grip line so that a reference measurement taken at this zero position is in fact representative of the total number of fibers in the sample. For measurement of cotton fibers, a zero position at 0.150 from the grip line has been found, to accurately indicate the number of fibers in the sample.

After having stored the zero position measurement reference in memory storage 26, the measurement cycle begins. Means for moving the sample 20 are activated and the sample begins to move in a direction which is parallel with the length of the fibers in the sample. As the sample moves with respect to the scan line, the analog-to-digital converter 18 continuously indicates the number of fibers present in the sample at the scan line. At the same time, the measurement reference stored in memory storage 26 is fed to a divider 30 which generates an output signal which is a predetermined percentage of the measurement reference. The output of the divider 30 forms one input to a comparator 32. The other input to comparator 32 comes from analog-to-digital converter 18. Comparator 32 compares the output of analog-to-digital converter 18 with the output of the divider 30 and indicates when they are substantially equal. At this point, the number of fibers present at the scan line is equal to the predetermined percentage set by the divider 30.

In order to determine the span length of the fibers at the point when the comparator 32 indicates that the particular predetermined percentage is present, it is necessary to record the amount of motion of the fiber sample. This is done by feeding an indication of fiber sample motion from the means 20 for moving the sample to a length measurement and recording unit 28. Length measurement and recording unit 28 acts to accumulate the successive indications of fiber sample motion until such time as the comparator 32 indicates that the desired percentage is present under the scan line. At this point, the accumulated information relative to sample motion is stored in length measurement and recording unit 28. Following a check of the intensity of the radiation source and a check on sample size via the Hi-Lo check circuit 29, the accumulated motion is recorded in some convenient fashion.

As was pointed out previously, one of the primary advantages of the system of the present invention is its ability to make fiber sample measurements at a rate far in excess of that possible with prior art devices. As was also pointed out, one of the difficulties with this increase in measurement speed is that it precludes the person operating the system from making detailed checks to see if the fiber sample is proper and to assure that the measuring system is operating properly. Thus, in addition to making the actual measurements themselves, the present system also makes certain checks and adjustments to insure the veracity of the measurement it generates.

One of the accuracy checks which the present system performs is the setting and checking of the light source 14 in scanner 13. At the beginning of each measurement cycle, prior to inserting the fiber sample into the system, the contents of analog-to-digital converter 18 are examined by a storage register and D/A converter 22. Since there is no fiber sample present, the amount of light impinging upon the photocell 16 is a direct indication of the intensity of the light source 14. If the light source is not of the proper intensity, storage register and D/A converter 22 act to generate a voltage which adjusts a regulated power supply 24 whose output controls the light source 14. After having adjusted the light source intensity, measurement takes place. At the end of the measurement cycle the intensity of the light source 114 is checked to make sure that it has not varied during the measurement cycle. A detailed explanation of the setting and checking of the light source intensity is set forth hereinafter in the detailed description of FIG. 5.

In addition to setting and checking the intensity of the light source 14, the present system also protects against fiber samples whose size is outside the permissible limits of the measuring system. That is, fiber samples which are physically either too large too small cannot be accurately measured by the measuring system. Since the memory storage 26 stores the measurement reference, a check of the contents of memory storage 26 can be utilized to assure that the fiber sample is within predetermined size limits as required by the measuring system. Therefore, at the end of each measurement cycle, an error checking unit 29 (shown in detail in FIG. 4) is activated to compare the contents of memory storage 26 with preestablished size limits. If the fiber sample is outside these size limits, error checking unit 29 prevents the information taken with respect to that sample from being recorded by the length measurement and recording unit 28.

Detailed operation of the various elements shown in the block diagram of FIG. 1 is set forth with respect to the description of FIGS. 2—7. Briefly, however, the present measuring instrument operates to quickly and accurately measure the span length of a sample of staple fibers in the following way. After activating the unit, but prior to inserting a fiber sample, the output of the scanner 13 is converted by analog-to-digital converter 18 to indicate the intensity of the light source 14. This signal is fed to a storage register D/A converter 22 which adjusts a regulated power supply 24 so as to begin with the desired light intensity. A fiber sample is then inserted into the measuring system and the scan line is positioned at the predetermined point referred to as the zero position where a measurement reference is to be measured. This measurement reference is stored in a memory storage 26 where it will be held and used to provide the measurement reference for all subsequent measurements on this sample.

After having taken the measurement reference, means 20 for moving the sample begin to move the sample with regard to the scan line in a direction parallel to the length of the fibers in the sample. Analog-to-digital converter 18 continuously indicates the number of fibers present at the scan line and this indication is compared by comparator 32 with the output of a divider 30 which has a output signal indicative of a predetermined percentage of the measurement reference. As the fiber sample moves, the amount of motion is recorded in a length measurement and recording unit 28. When comparator 32 indicates that the predetermined percentage of fibers is presently at the scan line, the amount of accumulated motion in length measurement and recording unit 28 is stored. Following a check on the intensity of light source 14 by zero check unit 27 and a verification by error checking unit 29 that the fiber sample is within a predetermined size limits, the information stored in length measurement and recording unit 28 is permanently recorded so as to provide requisite data with respect to the fiber sample. It should be noted that while the foregoing description has been limited to a single measurement of span length, it is evident that any number of such measurements can be taken by providing a divider 30 for each measurement desired and an individual comparator 32 to indicate when that particular percentage is present at the scan line. In this way, the amount of data taken with respect to a fiber sample can be increased at will.

The Logic System And Logic Elements

Before turning to a detailed description of FIGS. 2 through 7, it is necessary to make certain explanatory comments with respect to digital logic systems in general. The present embodiment is a hybrid digital-analog computational system. In the analog portion of the system, information is contained in analog voltage signals, the magnitude and polarity of the the analog voltage being indicative of the information contained therein. In the digital portion of the system, the information is contained in digital signals which are always in one of two distinct states referred to as logic levels. One of these logic levels is denoted UP or logic "1" and the other is the DOWN or logic "0" level. These two distinct logic levels are indicated by two different voltages, the UP or logic "1" level being ordinarily the higher voltage. For example, the logic "1" level may be 0 volts while the logic "0" level is a lower voltage such as −12volts.

Throughout the diagrams of FIGS. 2—7, a number of standardized logic symbols are used. Before turning to a detailed description of these figures, it is first necessary to explain the operation of these particular logic elements.

While suitable logic elements can be procured from many manufacturers, it will be convenient for the purposes of this specification to refer to logic elements shown in *The Digital Logic Handbook* (Digital Equipment Corporation, Maynard Massachusetts, 1966.)

Figure 3:
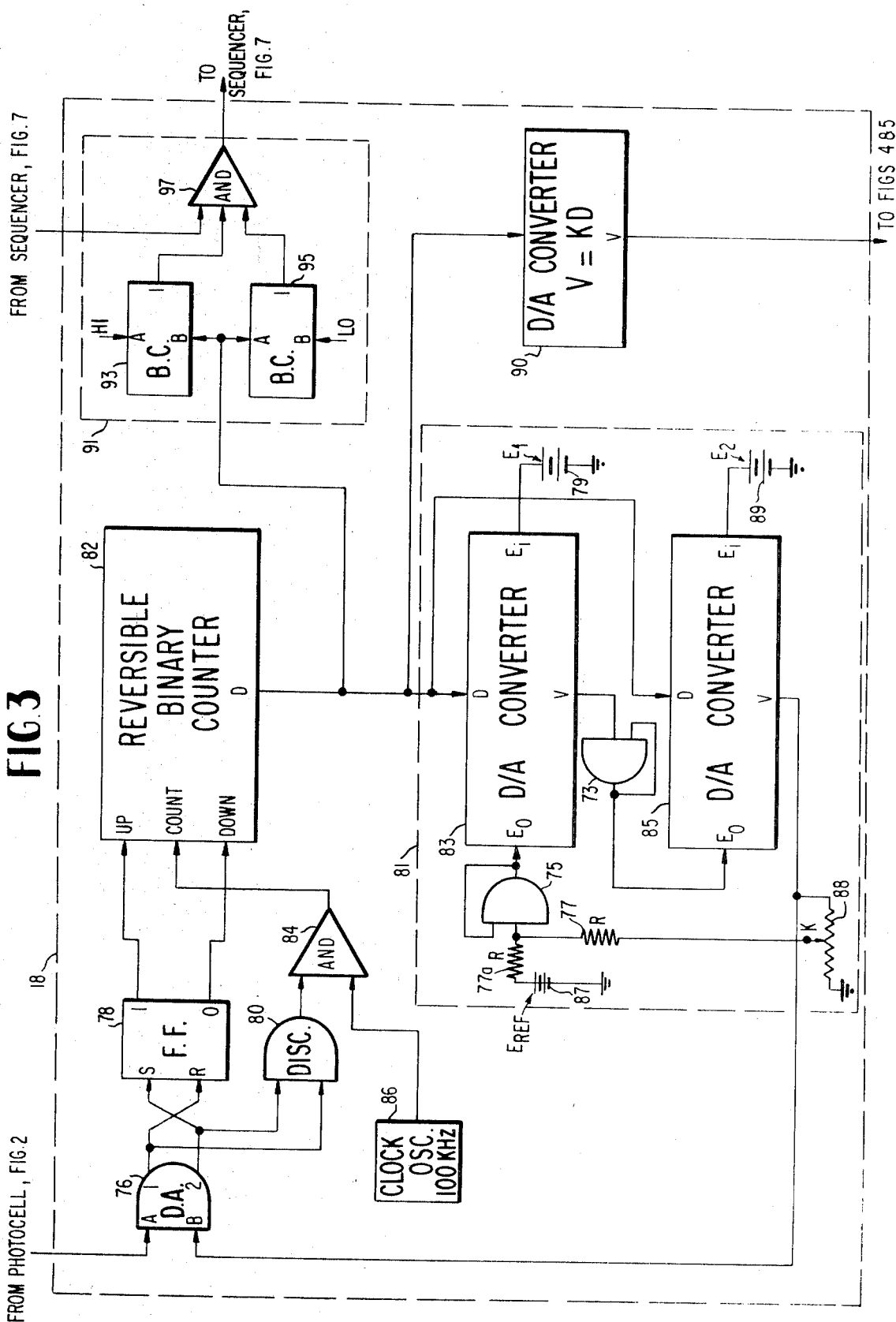
FIG. 3 is a detailed logic diagram of the analog-to-digital converter of FIG. 1.

One of the essential elements in any digital logic system is the master clock which controls the timing and synchronization of system operation. The logic element labeled "clock oscillator 100 kHz." 86 in FIG. 3 is a 100 kHz. clock oscillator. Such a clock oscillator may be found at page 55 of *The Digital Logic Handbook* and consists of a crystal controlled oscillator which generates a square wave of the desired frequency.

The logic element denoted "AND" and labeled 84 in FIG. 3 is a simple AND-gate. AND-gate 84 operates as follows — when all of the signals on its inputs (denoted by the arrows) are logic "1," the output is a logic "1." Under all other conditions, the output is a logic "0."

The logic element labeled "FF" 78 in FIG. 3 is a bistable device known as a flip-flop. Flip-flop 78 has two inputs (indicated by the arrows) labeled "S" and "R." Similarily, it has two corresponding output terminals labeled "1" to the "S" terminal will cause flip-flop 78 to assume the set state. When the flip-flop 78 is set, the logic signal present on the output terminals coincides with the labels shown for those terminals. That is, if flip-flop 78 is set, a signal on the "1" terminal will be a logic "1" and the signal on the "0" terminal will be a logic "0." Similarly, the "R" input terminal is the direct reset (or clear) terminal and applying a logic "1" to the "R" terminal causes flip-flop 78 to assume its reset (or clear) state. In this condition, the logic signals present on the output terminals are the inverse of those present when flip-flop 78 is set. That is, when flip-flop 78 is reset, a logic "0" terminal. Flip-flops of this general type are well known in the art and may be found at pages 6—7 of *The Digital Logic Handbook*.

Figure 2:
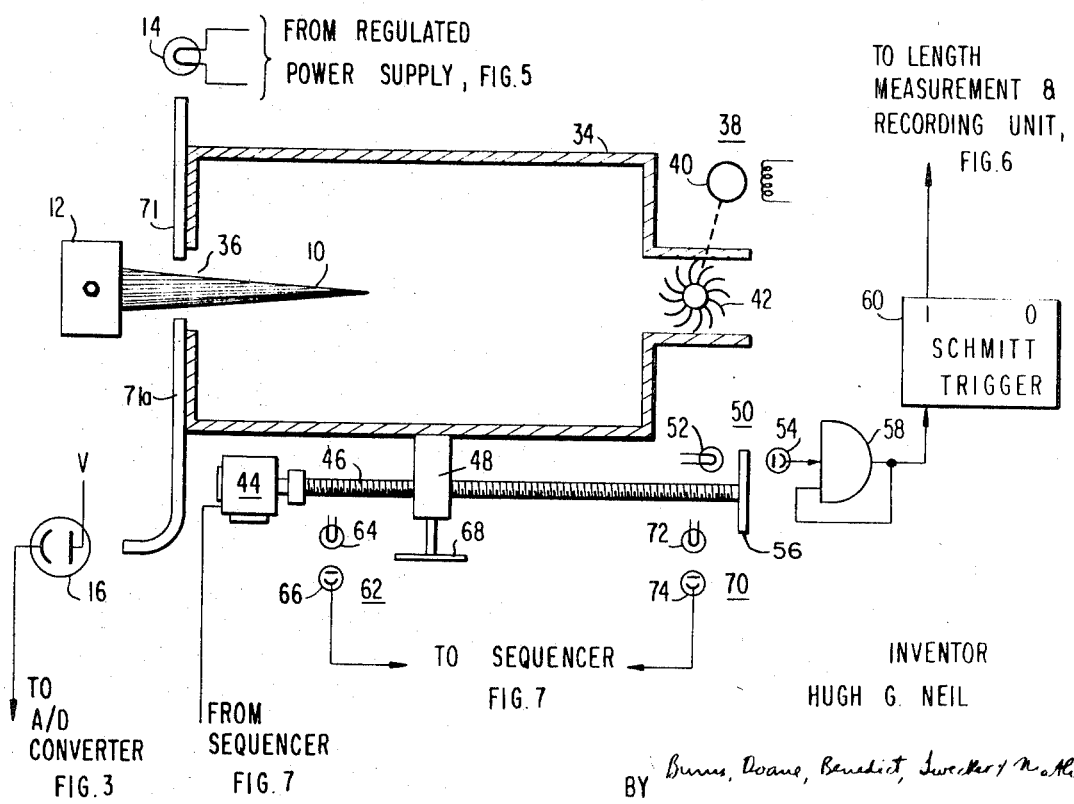
FIG. 2 disclosed a means for holding and scanning the fiber sample.

The logic symbol denoted 60 in FIG. 2 is a Schmitt trigger. A Schmitt trigger is a bistable device which assumes one state when the analog voltage on its input (denoted by the arrow) is at or above the predetermined level and assumes the opposite state when the voltage at the input is below the predetermined level. Thus, if the analog voltage at the input terminal is above the predetermined level the output terminals, labeled "1" and "0," will have logic signals corresponding to the labels on these output terminals. On the other hand, when the analog voltage is below the predetermined level, the output signals on these terminals will be the reverse of that indicated by the labels. Schmitt triggers of this type are also well known in the art and may be found at page 74 of

*The Digital Logic Handbook.*

Another type of well known logic element is a digital counter. In general, digital counters operate to count the number of logic pulses which appear at its input terminal. The simplest type of digital counter is a simple up counter such as the up-counter 140 shown in FIG. 6. Such a counter has a single input terminal labeled "Count" and operates to count in the positive direction each time a pulse is received on its "Count" input terminal. Such up-counters count according to a variety of codes such as pure binary or binary coded decimal and are capable of being expanded to accumulate any specified number of counts. An up-counter of this type may be found at pages 14—15 of *The Digital Logic Handbook*.

A similar, but somewhat more complex type of counter is the reversible (or up-down) counter 82 of FIG. 3. This type of counter operates to count input pulses in either the positive or negative direction. The input pulses are received on the "Count" terminal and the direction of counting is determined according to the logic level present on the "Up" and "Down" terminals. Thus, if a logic "1" is present at the "Up" terminal, the counter will count in a positive direction each time a pulse is received on the "Count" input terminal. On the other hand, if there is a logic "1" at the "Down" input terminal, the counter will count in the reverse direction each time the pulse is received on "Count" input terminal. Such reversible counters are also well known and can be found at pages 15—16 of *The Digital Logic Handbook*.

The logic element labeled "D/A converter" 90 of FIG. 3 is a digital-to-analog converter. Briefly, a digital-to-analog converter operates to convert an input digital number to an analog voltage signal, the magnitude (and sometimes polarity) of the analog signal being directly proportional to the magnitude (and polarity) of the input digital signal. A digital-to-analog converter of this type may be found at page 138 of *The Digital Logic Handbook*.

The amplifier labeled "D/A" of FIG. 3 is a differential amplifier which functions as a comparator. Such an amplifier is shown at page 143 of *The Digital Logic Handbook*. If the analog voltage at input terminal "A" is greater than the analog voltage at input terminal "B," the analog voltage at the "1" output terminal will be positive and the analog voltage at output terminal "2" will be negative. If the analog voltage at input terminal "B" is greater than the analog voltage at input terminal "A" then the polarity of the output terminals "1" and "2" is reversed. The magnitude of these output voltages is directly proportional to the absolute difference between the voltages at input terminals "A" and "B." If the gain of the amplifier is, for example, 1,000 then a difference of 1 millivolt between input terminals "A" and "B" results in output voltages of 1 volt. When the outputs of differential amplifier 76 are connected to a flip-flop (such as the connection to flip-flop 124 in FIG. 3) it can be utilized to set and reset the flip-flop whenever the magnitude of the output voltages reaches a certain limit. Thus, flip-flop 124 might be connected to differential amplifier 124 so as to set when the "1" output reaches +1volt and to reset when the "2" output reaches +1 volt.

The logic labeled "DISC" 80 in FIG. 3 is a discriminator. The function of the discriminator 80 is to generate a logic "0" on its output whenever analog voltages on its inputs (denoted by the arrows) are within predetermined limits. Such a discriminator may be constructed by modifying a differential amplifier of the type described above or by using a number of gates and inverters to carry out the logic function described.

The logic element shown as a triangle with a circle on its output in FIG. 7 is an inverter 188. Inverter 188 reverses the sense of the logic signal on its input (denoted by the arrow). That is, a logic "1" on the input results in a logic "0" on the output and vice versa. An inverter of this type may be found at page 34 of *The Digital Logic Handbook*.

The logic element labeled "OS" at 194 in FIG. 7 is a variable time delay monostable referred to as a one-shot. When its input (indicated by the arrow) goes to logic "1," the output will generate a pulse going from logic "0"to logic "1" for a predetermined duration. The pulse on the output will, however, be delayed by a certain time following the time when the input goes to logic "1. " A one-shot of this type can be found at page 53 of *The Digital Logic Handbook*.

The logic element labeled "BC" 93 in FIG. 3 is a bit comparator which compares digital numbers on its inputs "A" and "B" and generates a logic "1" on its output "1" if the digital number on the "A" input terminal is greater than the digital number on the "B" input terminal. A bit comparator of this type can be found at page 28 of *The Digital Logic Handbook*.

Finally, the amplifier 58 denoted by the "D" symbol in FIG. 2 is a simple amplifier. The amplifier may be used for raising signal levels or for the purposes of isolating various stages in the computational system. Such an amplifier might be an ordinary operational amplifier such as shown on page 142 of *The Digital Logic Handbook*.

The Sample Holder & Scanner

FIG. 2 discloses a means for holding and scanning the fiber sample 10. As in FIG. 1, the sample 10 is held in a sample holder 12.

In order to hold the sample substantially straight and flat for measurement purposes, the present embodiment utilizes a vacuum chamber 34 having an aperture 36 into which the fiber sample 10 is inserted. A vacuum pump, shown generally at 38, is used to continuously evacuate the vacuum chamber 34 so that the fiber sample inserted into the aperture 36 is drawn into the vacuum chamber 34 and held substantially straight by the difference in atmospheric pressure. The evacuating pump 38 may be of any suitable construction including a driving motor 40 and an impeller 42.

In order to measure sample characteristics, it is necessary to vary the position of the scan line relative to the sample. In the embodiment of FIG. 2, the vacuum chamber 34 will be driven so as to vary the point at which the fiber sample 10 is scanned. It will be evident that identical results are obtained by maintaining the vacuum chamber 34 in a stationary position and moving the sample holder 12.

In order to move the vacuum chamber 34, there is provided a drive motor 44 coupled to a lead screw 46. Lead screw 46 is connected to a ball nut 48 attached to the vacuum chamber 34. When the drive motor 44 rotates, the vacuum chamber 34 will be driven back and forth according to the rotation of drive motor 44.

As the vacuum chamber 34 moves, it is necessary to record the amount of movement so as to continuously indicate the position of the scan line. In the embodiment of FIG. 2 this movement is indicated by an encoder 50 which is coupled to the lead screw 46 The output of encoder 50 is fed to the length measurement and recording unit shown in detail in FIG. 6.

In the present embodiment, the encoder 50 is an optical encoder comprising a light source 52 and a photocell 54. A disc 56, which has a number of slits engraved therein is interposed between the light source 52 and the photocell 54. Rotation of the disc 56 results in intermittently blocking the transmission of light from light source 52 to photocell 54. As the disc 56 rotates, the output of the photocell 54 will be a series of pulses, one pulse occuring each time an aperture in the disc 56 allows light to pass from the light source 52 to the photocell 54. Since the apertures are engraved at specified intervals, each pulse out of the photocell 54 is indicative of a predetermined amount of motion of the vacuum chamber 34.

The output of the photocell 54 is connected to an amplifier 58 which raises the signal level and provides isolation. The output of amplifier 58 is connected to form the input to a Schmitt trigger 60 which shapes the output pulses of amplifier 58 into discreet digital pulses which are relayed to the length measurement and recording unit shown in detail in FIG. 6.

In addition to indicating the amount of motion of the vacuum chamber 34, it is also necessary to provide an indication of the beginning and end points in the measurement cycle. As was pointed out above, each measurement starts at a predetermined point relative to the sample holder 12. This predetermined position is indicated by a limit switch such as the optical limit switch 62 which consists of a light source 64 and a photocell 66. As the vacuum chamber 34 moves toward the sample holder 12, a vane 68 is interposed between light source 64 and photocell 66 so as to interrupt the transmission of light to photocell 66. The output of the photocell 66 is fed to the sequencer (shown in detail in FIG. 7) to indicate when the vacuum chamber 34 has reached the beginning position so as to start measuring the characteristics of the fiber sample 10.

It is also necessary to indicate when the vacuum chamber 34 has traveled to the end of the measurement cycle. This is accomplished by a second optical limit switch 70 consisting of a light source 72 and a photocell 74. During measurement, the vacuum chamber 34 moves away from the sample holder 12 until it reaches the end of the measurement cycle at which point the vane 68 will be interposed between light source 72 and photocell 74. The output of photocell 74 is also fed to the sequencer of FIG. 7. Interruption of this limit switch will indicate the end of the measurement cycle.

In the embodiment of FIG. 2, the means for scanning the fiber sample 10 includes a light source 14 whose light rays pass through the fiber sample 10 and impinge upon a photocell 16. In order to provide a discreet light beam so as to constitute a relatively narrow scan line, there is provided a pair "light pipes" 71 and 71a for routing the light from the source 14 to the photocell 16. These "light pipes" consist of fiber optic devices of the type well known in the art. The first light pipe 71 receives light from the light source 14 and transmits these light rays to the fiber sample 10. The second light pipe 71a receives any light rays which pass through the fiber sample 10 and routes these light rays o the photocell 16.

The Analog-to-Digital Converter

FIG. 3 is a detailed logic diagram of the analog-to-digital converter 18 of FIG. 1. Analog-to-digital converter 18 is of the continuous type as explained at pages 263—264 of *The Digital Logic Handbook*. A reversible counter is used to convert the analog voltage to a digital number, the output of the reversible counter being converted to an analog voltage which is compared with the input analog voltage. The results of this comparison modify the contents of the reversible counter unless the two analog voltages are substantially equal. Analog-to-digital converter of FIG. 3 is of a specialized type which converts an analog voltage to a digital number which is *not* a linear function of the analog voltage but is rather a complex function approximating an inverse exponential.

The output of the photocell 16 of FIG. 2 forms the first input to a differential amplifier 76. Differential amplifier 76 controls the state of a flip-flop 78 which controls the direction in which a reversible binary counter 82 counts. The reversible binary counter 82 is triggered by a clock oscillator 86 whose output pulses are fed through an AND-gate 84 to the "Count" input terminal of the reversible binary counter 82. The clock pulses from the oscillator 86 are relayed to counter 82 unless the output of a discriminator 80 is a logic "0" at which time the pulses are no longer relayed and the reversible counter holds its present state.

The digital number stored in reversible binary counter 82 is converted to an analog voltage by a complex digital-to-analog function generator indicated generally at 81. For the time being, it suffices to say that the output of the function generator 81 is an analog voltage governed by the relationship $V = e^{1KD}$, where $V$ = analog voltage output, $D$ = input digital number, and $K$ = an appropriate constant of proportionality.

The output of function generator 81 forms the second input to differential amplifier 76. If the analog voltage from the photocell 16 is larger than the analog voltage from function generator 81, the "1" output of differential amplifier 76 will be positive. This will cause flip-flop 78 to assume the reset state in which case the "0" output is a logic "1," which commands the reversible binary counter 82 to count down. As the counter 82 counts down, the output voltage from function generator 81 will rise until such time as the output of function generator 81 is equal to the output of the photocell 16. At this point, the outputs of differential amplifier 76 will be within the discriminator limits and the output of the discriminator 80 will be a logic "0" and reversible binary counter 82 will stop counting. The number which is then stored in reversible counter 62 is the digital equivalent of the analog voltage from the photocell and is a direct representation of the number of fibers at the scan line.

Note that the analog-to-digital converter 18 can operate at a very high rate by virtue of the use of digital components disclosed. Since the clock oscillator counts the reversible binary counter at a 100 kHz. rate, the analog-to-digital converter can continuously indicate the number of fibers in the sample even though the scan line is moving at a relatively high rate. Thus, the fiber sample can be scanned very quickly and at the same time with accuracies which are far in excess of those previously possible.

The complex digital-to-analog function generator 81 consists of two digital-to-analog converters 83, 85 connected in cascade. Because of the way in which they are connected, it is necessary to give special consideration of the type of digital-to-analog converter used. Briefly, in order to allow certain special connections, such as the use of lower references voltages, these digital-to-analog converters must be of the type which allows the reference voltage to be varied and/or supplemented. A digital-to-analog converter of this type is shown in copending application Ser. No. 795,935 of the present inventor, Feb. 3, 1969.

The digital-to-analog converters 83, 85 have three input terminals. The input labeled "$D$" is for the digital number to be converted to an analog voltage. While shown as a single input, it should be noted that this input in fact receives all the binary bits of the number stored in reversible counter 82. The "$E_o$" input is the high reference voltage input and the "$E_i$" input is the high reference voltage input and the "$E_i$" input is a lower reference voltage input. The single output "$V$" is for the analog voltage output which relates to the three inputs in accordance with the following:

$$V = D(E_o + E_i) + E$$

where $V$ = output voltage, $D$ = digital input, $E_o$ = high reference voltage and $E$ = low reference voltage. In this and all subsequent relationships set forth, the variables have been "normalized" i.e. have a maximum value of 1 and variations are expressed in values between 0 and 1.

The analog voltage output of the first digital-to-analog converter 83 is fed to the high reference voltage input $E_o$ of the second digital-to-analog converter 85 via amplifier 73. The digital output of the converter 82 forms the digital input $D$ on both converters 83, 85. The high reference voltage input $E_o$ on both converters 83, 85. The high reference voltage input $E_o$ on converter 83 is connected to the output of amplifier 75. The inputs to amplifier 75 are through equal resistors 77, 77a so that the output is the sum of a fixed voltage from a reference source 87, plus a predetermined percentage of the output of the second converter 85 established by a voltage divider 88. The lower reference voltage inputs $E_i$ on both converters 83, 85 are connected to lower voltage sources 79, 89 respectively.

Operationally, the complex digital-to-analog function generator 81 generates an inverse exponential in the following way:

1. The higher reference voltage input $E$ on converter 83 is:

$$E_o = _{ref} + KV_o$$

where
$E_{ref}$ = reference voltage 87
$K$ = normalized setting of voltage divider 88
$V_o$ = output of converter 85.

2. The output of converter 83 (with $E_{ref}=1$) is:

$$V_1 = (1 + KV_o - E_1) + E_1$$

where
$V_1$ = output of converter 83
$V_o$ = output of converter 85
$E_1$ = lower reference voltage 79.

3. The output of the converter 85 (and thus of the function generator 81) is:

$$V_o = (V_1 - E_2) + E_2$$

where
$E_2$ = lower reference voltage 89.

Substituting for $V_1$ from (2).

$$V_o = [(D + DKV_o - _1 + E_1) - E_2 a - ] - E_2$$

Solving for $V_o$:

$$V_o - ^2KV_o = D^2(1 - E_1) + D(E_1 - E_2) + E_2$$

$$V = \frac{D^2(1+E_1) - D(E_1 - E_2) + E_2}{1 - KD^2}$$

This relationship can be converted to an exponential approximation by appropriate choice of the variables, $K$, $E_1$ and $E_2$.

In one particular application of the present system, values of $K=0.45$, $E_1=0.15$, and $E_2=0.075$ result in a function approximating $$V_0 = e^{-2.6D}$$

which expresses the relationship between the voltage output of the photocell 16 and the number of fibers at the scan line.

The output of the counter 82 is also fed to a conventional digital-to-analog converter 90 whose output voltage is directly proportional to the digital number in the counter 82. This output is then an analog voltage representation of the number of fibers at the scan line and is used elsewhere in the system as pointed out hereinafter in conjunction with FIGS. 4 and 5.

Finally, there is provided a "zero check" circuit 91 whose operation will be explained in the section of these specifications labeled "Setting and Checking the light source.".

The Memory Storage, Divider and Comparator

Figure 4:
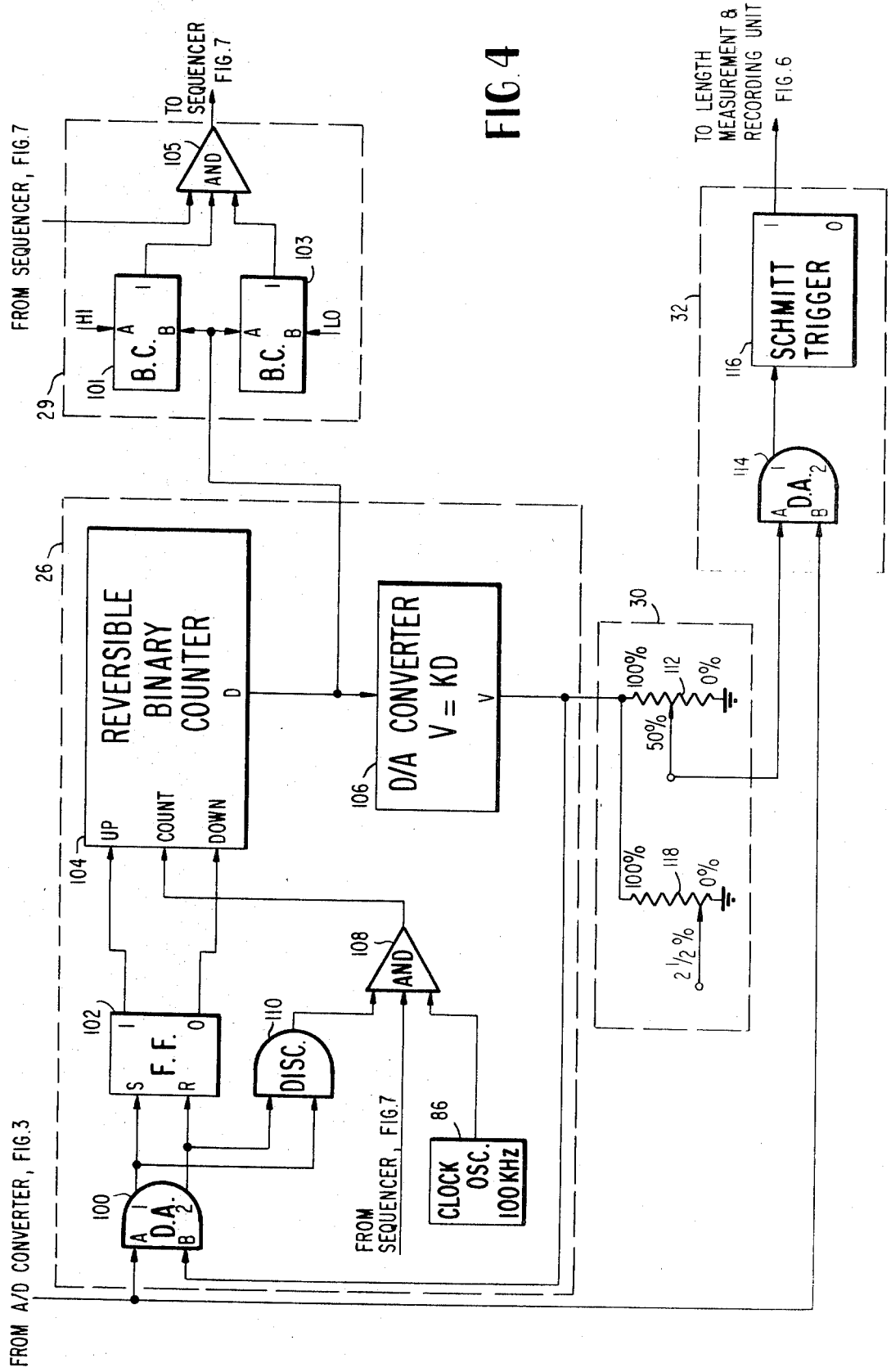
FIG. 4 is a detailed logic diagram of the memory storage, divider, comparator and error checking unit of FIG. 1.

FIG. 4 is a detailed logic diagram of the memory storage 26, the divider 30 and the comparator 32 of FIG. 1. It will be recalled that the purpose of memory storage 26 is to store the measurement reference which is generated by the analog-to-digital converter 18 when the sample is at the zero position.

In order to store the measurement reference generated in analog-to-digital converter 18, the output of the digital-to-analog converter 90 of FIG. 3 forms one of the inputs to the memory storage 26. This input is fed into "A" input terminal of differential amplifier 100. Differential amplifier 100 controls the state of flip-flop 102 which in turn controls the direction in which a reversible binary counter 104 counts. The contents of reversible binary counter 104 are converted to an analog voltage by digital-to-analog converter 106. The output of digital-to-analog converter 106 forms the second input to differential amplifier 100.

It will be recalled that digital-to-analog converter 90 in FIG. 3 generates an output voltage which is directly proportional to the number stored in the reversible binary counter 82 of that same figure. It will also be recalled that the purpose of memory storage 26 is to store that same number in reversible counter 104 of FIG. 4. This is accomplished by comparing the output of digital-to-analog converter 90 with the output of digital-to-analog converter 106. If the output of the digital-to-analog converter 90 is larger, this means the number stored in reversible binary counter 82 is larger than the number stored in reversible binary counter 104. Under these conditions, output terminal "1" of differential amplifier 100 will be positive which causes flip-flop 102 to assume the set state. Since flip-flop 102 is set, a logic "1" will be present at its "1" output terminal, thereby steering the reversible binary counter 104 is larger than the number stored in reversible binary counter 82 the output of the digital-to-analog converter 106 will be greater than the output of digital-to-analog converter 90 so that the output terminal "2" of differential amplifier 100 will be positive. This will cause flip-flop 102 to assume the reset state, in which case a logic "1" appears at its "0" output terminal, thereby steering reversible counter 104 to count down.

Reversible binary counter 104 is counted by pulses from the clock oscillator 86 (also shown in FIG. 3). The clock pulses from clock oscillator 86 form one input to AND-gate 108. The other inputs to AND-gate 10 comes from a discriminator 110 and from the sequencer shown in FIG. 7. When the fiber sample is at the zero position, the sequencer will put out a logic "1" to memory storage 26 so as to store the number in counter 82 of analog-to-digital converter 18 in the reversible counter 104. This signal from the sequencer forms a second input to AND-gate 108. So long as the two inputs to differential amplifier 100 are not equal, the output of the oscillator 86 will be gated through AND-gate 108 and cause reversible counter 104 to count in the direction as determined by the flip-flop 102. As soon as the contents of reversible counter 104 are the same as the contents of reversible binary counter 82, the outputs of differential amplifier 100 will be within the discriminator limits thereby causing the output of discriminator 110 to go to logic "0" blocking gate 108 and holding the count in reversible counter 104. As this time the signal from the sequencer will go to logic "0" thereby inhibiting further counting of reversible counter 104 and retaining the measurement reference in the reversible counter 104. This stored number represents the number of fibers in the sample at the zero position. Subsequent measurements are all made with reference to this stored number.

In the present embodiment, the number stored in counter 104 is first converted to an analog voltage by digital-to-analog converter 106 before it is used in subsequent measurements. Thus, the output of digital-to-analog converter 106 is fed to the divider 30. In the present embodiment, divider 30 is shown as a simple voltage divider which generates an output signal equal to a predetermined percentage of the measurement reference.

In the present embodiment, the measuring instrument is to indicate the span length of two given percentages of fibers in the sample. The first percentage is the 50 percent point and the second is the 2.5 percent point. Thus, a voltage divider 112 is adjusted to the 50 percent point so as to put out an analog voltage proportional to 50percent of the fibers in the sample. This analog voltage is fed to the comparator 32 which has as its second input the analog voltage from the digital-to-analog converter 90 of FIG. 3. During measurement, the voltage output by digital-to-analog converter 90 will be directly proportional to the number of fibers presently at the scan line. This voltage is compared by a differential amplifier 114 with the output of the voltage divider 112.

At the beginning of the measurement cycle, the scan line is at the zero point so that the output of the digital-to-analog converter 90 is equivalent to the measurement reference. This voltage is connected to input terminal "B" of differential amplifier 114. The other input terminal of differential amplifier 114 is connected to the voltage divider 112 whose output is representative of 50 percent of the fibers in the sample. Accordingly, at the beginning of the measurement cycle the voltage at input terminal "B" is greater than the voltage at input terminal "A" so that a negative voltage is present at output terminal "1" of differential amplifier 114. This output forms the input to Schmitt trigger 16 and since this voltage is negative, Schmitt trigger 116 will be in the reset state so that the logic signal on its "1" output terminal is a logic "0". As the scan line begins to move along the fiber sample, the output of digital-to-analog converter 90 begins to decrease until such time as the number of fibers at the scan line is equal to 50 percent of the number of fibers at the zero position at which time voltage from digital-to-analog converter 90 will be equal to the voltage out of divider 30. At this point, the logic "1" causing Schmitt trigger 116 to change state. The output of Schmitt trigger 116 is relayed to the sequencer of FIG. 7 to indicate that the 50 percent point has been reached. This indication is relayed from the sequencer to the length measurement and recording unit to store the span length of the predetermined percentage of fibers.

It will be noted that an additional voltage divider 118 is also shown in the divider 30. This additional voltage divider is used for indicating the 2.5 percent point. The output of the voltage divider 118 is connected to the second comparator (not shown) which generates a second output signal to the sequencer of FIG. 7 when the number of fibers at the scan line is equal to 2.5 percent of the number of fibers at the zero position. This information is similarly stored in the length measurement and recording unit of FIG. 6.

The "Hi-Lo Check" circuit 29 will be explained in detail hereinafter in the section labeled "Setting and Checking the Light Source."

Setting & Checking The Light Source

As was pointed out above, in a measuring instrument of the present type, speed of measurement is a primary factor. In addition, however, it is necessary to make sure that all measurements taken are made under satisfactory conditions. One of the important considerations is the intensity of the light source which scans the fiber sample. In the present embodiment, the intensity of the light source will be set before measurement takes place and checked after measurement to insure against any drift, etc. during the measurement cycle which would adversely affect measurements taken.

The intensity of this light source 14 is set at the beginning of each measurement cycle before the fiber sample is inserted into the scan line. At this time, all of the light emanating from light source 14 will be received by the photocell 16 so that the contents of the reversible binary counter 82 in FIG. 3 will represent the intensity of the light source. The contents of counter 82 is converted to an analog voltage by digital-to-analog converter 90 whose output is then fed to storage register and D/A converter 22 for the purposes of calibrating the light source 14. As can be seen from FIG. 5, the analog voltage output from digital-to-analog converter 90 forms one input to a differential amplifier 120. The other input to differential amplifier 120 comes from a "zero set" potentiometer 122 which provides a reference voltage representative of the desired intensity of the light source. It may be recalled from the detailed description of FIG. 3 that the number stored in reversible counter 82 and consequently the output of digital-to-analog converter 90 is inversely proportional to the output of the photocell 16. Thus, if the intensity of the light source 14 is below the desired intensity, the output of digital-to-analog converter 90 will be greater than the desired voltage as indicated by the "zero set" potentiometer 122. Under these conditions, the "1" output terminal of differential amplifier 120 will be a logic "1."

Since the outputs of differential amplifier 120 are connected to the set and reset inputs of flip-flop 124, flip-flop 124 will assume a set state. Since flip-flop 124 is used to control the counting of reversible binary counter 126, counter 126 will then be steered to count up for each pulse received on its count input terminal. The pulses on the "Count" input terminal of counter 126 are received from AND-gate 128. AND-gate 128 has three inputs, the first coming from discriminator 130 whose output will be logic "1" until such time as the light source 14 has the desired intensity. The second input to AND-gate 128 comes from the sequencer (shown in detail in FIG. 7). The signal from the sequencer will be a logic "1" at this time to allow setting of the light source 14. The third and final input to AND-gate 128 is the output of a clock oscillator 132. Thus, AND-gate 128 relays the clock pulses from clock oscillator 132 so as to count binary counter 126 in the commanded direction.

The number stored in binary counter 126 forms the input to a digital-to-analog converter 134 whose output is an analog voltage directly proportional to the number stored in binary counter 126. This analog voltage forms the reference voltage input to the regulated power supply 24 which controls the intensity of the light source 14.

If the intensity of the light source is less than that desired, binary counter 126 will count in positive direction as explained above. This will cause the output voltage from digital-to-analog converter 134 to increase. Since this voltage forms the reference voltage for the regulator power supply 24, the output of the power supply 24 will increase thereby increasing the intensity of the light source until such time as the output of analog-to-digital converter 90 is the same as the setting of the "zero set" potentiometer 122 at which time the light source 14 is at its desired intensity.

It will be noted that the counter 126 counts at a relatively slow (30Hz) rate rather than at a regular clock frequency (100kHz). This is due to the fact that the light source 14 does not immediately respond to increases in binary counter 126 and hence the lower counting rate is necessary in order to stabilize the loop.

As described above, the setting of the light source 14 takes place prior to the actual measurement cycle. In addition to setting the light source before making the measurements, the present system also provides for checking the light source at the end of each measurement to make sure that the light source has not varied during the measurement cycle.

The light source intensity is checked by the zero check circuit 91 shown in detail in FIG. 3. When the end of the measurement cycle is reached, the sequencer of FIG. 7 activates the zero check circuit 91. At this point, the fiber sample is no longer at the scan line so that all the light from light source 14 is impinging upon the photocell 16 as was the case when the intensity of the light source 14 was set. Thus, the contents of the counter 82 indicate the present intensity of the light source 14. Since minor variations of the light source 14 are permitted without adversely affecting the measurements taken, the intensity of the light source need not be precisely the same as it was at the beginning of the measurement cycle. It must, however, fall within certain defined limits.

The upper limit is established by a digital number which forms the "A" input to bit comparator 93. The contents of counter 82 forms the "B" input to bit comparator 93. If the contents of counter 82 is less than the upper limit, the output of bit comparator 93 will be a logic "1."

The lower limit is established by a digital number which forms the "B" input to a second bit comparator 95. The contents of counter 82 forms the "A" input to comparator 95. If the contents of counter 82 is greater than the lower limit, the output of bit comparator 95 is also a logic "1."

If the outputs of comparators 93, 95 are both logic "1," the contents of counter 82 is less than the upper limit but greater than the lower limit. These two outputs are connected to the inputs of AND-gate 97. The third input to AND-gate 97 comes from the sequence of FIG. 7. Thus, the output of AND-gate 97 will be a logic "1" if the light intensity is within limits at the end of the measurement cycle. This signal is fed to the sequencer of FIG. 7 to allow the data stored in the length measurement and recording unit to be recorded if the Hi-Lo check circuit 29 indicates that the sample was within size limits.

In addition to checking the light source intensity, the foregoing check also assures that there are no hairy extensions on the end of the sample. This is because the sample would normally be completely withdrawn from the scan line when this check is made. These hairy extensions, however, extend beyond the normal length of the sample so that they will still be present at the scan line when this check is made. Their presence will diminish the amount of light received by the photocell to a point where the intensity of the light source will appear to be out of permissible limits.

The Hi-Lo check circuit 29, shown in detail in FIG. 4, is used to verify that the fiber sample is within predetermined size limits. Its operation is identical to the zero check circuit 91 described above.

The sample size is indicated by the contents of binary counter 104 which, it will be recalled, contains the measurement reference, a digital number representative of sample size. The Hi limit forms the "A" input to a first bit comparator 101 while the Lo limit forms the "B" input to a second bit comparator 103. The contents of counter 104 is fed to the "B" and "A" inputs of comparators 101, 103 respectively.

As was explained in describing the zero check circuit 91, the outputs of both bit comparators 101, 103 will be logic "1" if the contents of counter 104 is within permissible limits. These outputs form two of the inputs to AND-gate 105. The third input to AND-gate 105 comes from the sequencer of FIG. 7 which activates the Hi-Lo check circuit 29 at the end of the measurement cycle. The output of AND-gate 105 is fed back to the sequencer of FIG. 7 to indicate that the sample is within the size limits.

THE LENGTH MEASUREMENT AND RECORDING SYSTEM

Figure 6:
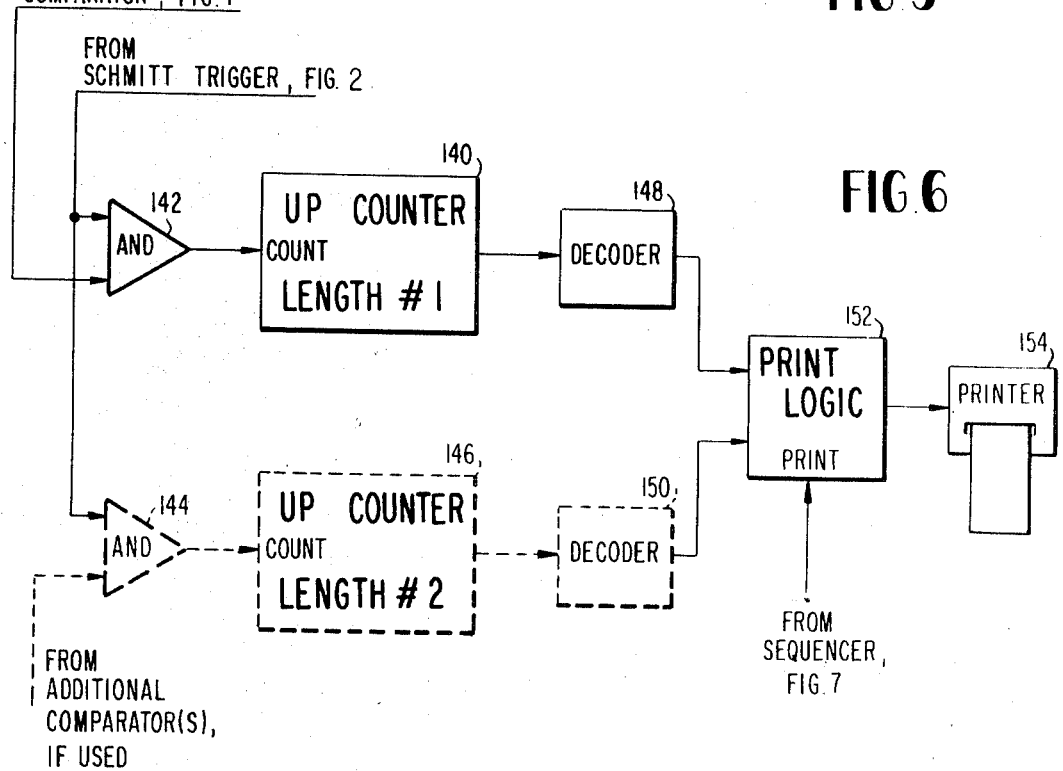
FIG. 6 is a detailed logic diagram of the length measurement and recording unit of FIG. 1; and, FIG. 7 is a detailed logic diagram of a "sequencer" which controls the sequence of operations of the system shown in FIG. 1.

FIG. 6 is a detailed block diagram of the length measurement and recording system 28 of FIG. 1. It will be recalled that the length measurement and recording system 28 accumulates the pulses indicating movement of the scan line and then records the accumulated distance in response to the output of the comparator 32.

Pulses from the Schmitt trigger 60 of FIG. 2 form one input to an AND-gate 142. It will be recalled that each pulse from Schmitt trigger 60 indicates the scan line has moved a predetermined distance, say 0.001 inch, during the measurement cycle. The other input to AND-gate 142 comes from the sequencer shown in detail in FIG. 7. It will be seen that the output of the sequencer is a logic "1" until such time as the number of fibers present at the scan line is equal to the predetermined percentage previously set in the divider 30. Hence, as long as the predetermined percentage is not yet reached, pulses from Schmitt trigger 60 (FIG. 2) are gated through AND-gate 142 to the "Count" terminal of an up-counter 140. Up-counter 140 accumulates these pulses and provides an indication of the amount of motion of the scan line.

It will be recalled that the contents of counter 140 is to represent span length, a measurement defined as the protrusion from the grip line. It will also be recalled that measurement began from a zero position which was some specified distance from the grip line. Therefore, it is necessary to preset counter 140 to an amount equal to the distance from the zero position to the grip line. In this way, counter 140 will accurately reflect span length since the amount of motion from the zero position will be added to the zero position thereby indicating the amount of protrusion from the grip line.

When the comparator 32 indicates that the predetermined number of fibers are present at the scan line, the logic signal from the sequencer changes from logic "1" to logic "0" thereby inhibiting further accumulation of pulses by the up-counter 140. In this way, the up-counter 140 stores the span length of the previously set percentage of fibers.

The length measurement and recording unit of FIG. 6, as explained thus far, is capable of recording the span length of a single predetermined percentage of fibers in the sample. By providing additional voltage dividers (such as the voltage divider 118 of FIG. 4) an additional comparators to compare their outputs with the output of the analog-to-digital converter 18, it is possible to accumulate as much information with respect to the fiber sample as desired. If additional information of this type is desired, it is necessary to provide additional AND-gates such as AND-gate 144 and additional up-counters such as up-counter 146 in the length measurement and recording unit of FIG. 6.

After having stored the desired span length information during the measurement cycle in up-counter 140, it may then be desired to provide some type of permanent visual record of the span length information. This is accomplished by a decoder 148 (and 150 if used), the print logic indicated generally at 152 and some type of recording device such as the printer 154. The function of decoder 148 is to convert the number stored in up-counter 140 to signals which can be properly handled by the print logic prior to recording by the printer 154. Thus, decoder 148 may comprise a digital converter which converts the number (which may be true, binary, or binary coded decimal, for examples) stored in up-counter 140 to a form useful by the printer 154 (such as decimal digits).

It will be recalled that the information which is stored in the length measurement unit will not necessarily be recorded if the light source intensity varied during measurement or if the sample is of improper size or configuration. Thus, print logic 152 requires a signal from the sequencer of FIG. 7 before it activates the printer 154.

It should be also noted that the particular method of recording the information is not critical to the present invention. Thus, information might be recorded on a conventional printer, or, alternatively, the information with respect to each sample might be printed and/or punched on a card which could then be attached to the fibrous lot from which the sample was taken so as to provide an instantaneous visual record of the fiber characteristics as measured for that fibrous lot.

THE SEQUENCER

FIG. 7 is a detailed logic diagram of the sequencer which controls the timing and sequence of operation of the various elements shown in detail in FIGS. 2—6.

The measurement cycle begins by closure of a start switch shown generally at 186. Closing the start switch applies a logic "1" to the set input of flip-flop 170 and causes flip-flop 170 to assume the set state. It should be noted that the start switch 186 is shown symbolically as a push button for beginning the cycle. In actual applications, however, the start switch 186 may be a limit switch which is actuated when the sample is placed in the measuring instrument.

At the beginning of each measurement cycle, the vacuum chamber 34 of FIG. 2 is in the position which is occupied at the end of the previous measurement cycle. That is, the vacuum chamber 34 will be positioned the maximum distance away from the sample holder 12 so that when the fiber sample is placed in the measuring instrument it will not extend into the aperture 36 and hence does not yet appear at the scan line.

Figure 5:
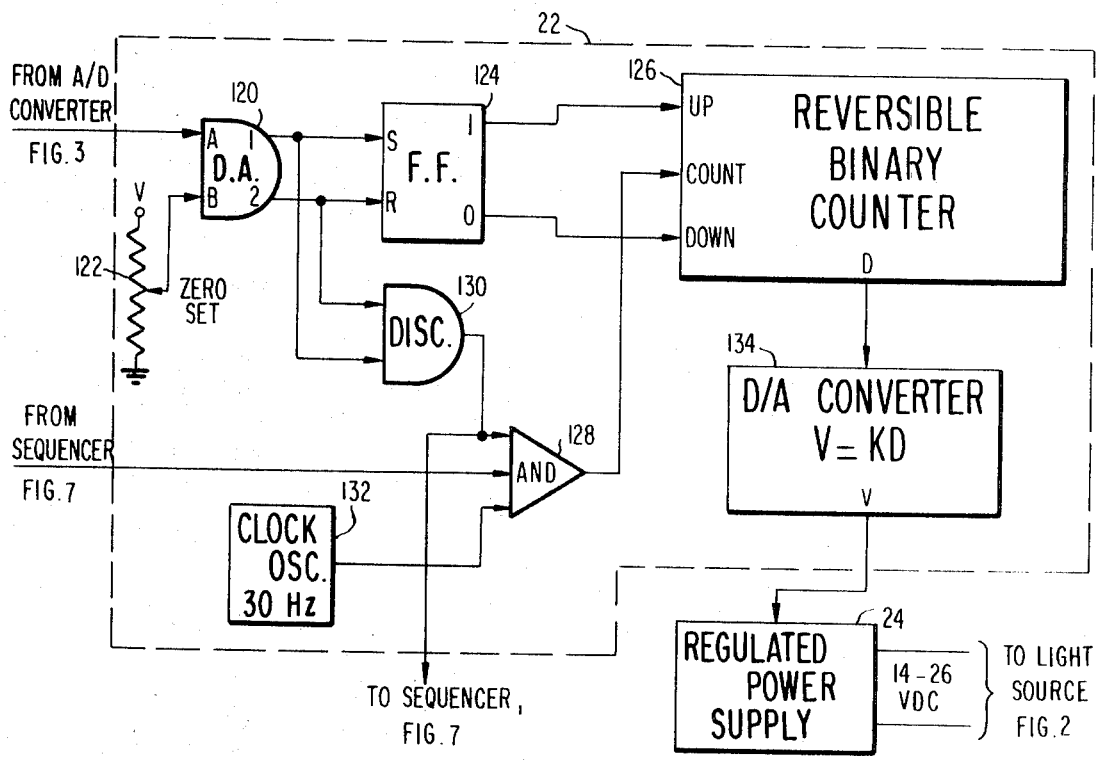
FIG. 5 is a detailed logic diagram of the storage register and D/A converter and regulated power supply of FIG. 1.

Setting flip-flop 170 causes the "1" output to go to a logic "1." This signal is relayed to gate 128 in FIG. 5 so as to initiate the setting of the light source. Flip-flop 170 remains in the set state until such time as the discriminator 130 in FIG. 5 indicates that the light source is set. At this time the output of the discriminator 130 goes to a logic "0." This signal is fed to the input of inverter 188. The output of inverter 188 then goes to a logic "1." Since this output forms one of the inputs to the AND-gate 190, the output of AND-gate 190 will go to a logic "1."

When the output of AND-gate 190 goes to a logic "1," flip-flop 170 will reset and flip-flop 172 will set. This indicates that the light source has been set and the measurement cycle can now begin. Since the vacuum chamber was at the end of the measurement cycle, it is first necessary to drive the vacuum chamber to the zero point. Thus, the output of flip-flop 172 goes to the motor 44 in FIG. 2 and causes it to drive the vacuum chamber toward the sampler holder 12. The vacuum chamber continues to move in that direction until the limit switch 62 indicates that the vacuum chamber 34 is at the zero position. At this point, the output of the zero position limit switch 62 resets flip-flop 172, stopping the drive motor 44.

The output of the zero position limit switch 62 also forms one of the inputs to an AND-gate 192. When the zero position limit switch 62 is reached, the output of AND-gate 192 goes to a logic "1" thereby setting flip-flop 174. When flip-flop 174 sets, its "1" output goes to a logic "1." This signal relayed to AND-gate 108 in FIG. 4 so as to initiate the transfer of the measurement reference into the memory storage 26. The "1" output of flip-flop 174 also forms the input to a one-shot 194. After the predetermined time delay of one-shot 194, its output goes to a logic "1" and resets flip-flop 174. The setting of one-shot 194 determines the amount of time for which flip-flop 174 remains set. This time is adjusted so as to be only as long as necessary to transfer the reference measurement from analog-to-digital converter 18 to the memory storage 26.

The output of one-shot 194 is also forms one of the inputs to AND-gate 196 whose output is fed to the set input of flip-flop 176. When the output of one-shot 194 goes to a logic "1," the measurement reference has been stored in the memory storage 26 and the measurement cycle is ready to begin. Thus, setting flip-flop 176 indicates the beginning of the measurement cycle. The output of AND-gate 196 is also fed to the set input terminals of flip-flops 178 and 180. Thus, at the beginning of the measurement cycle, flip-flops 176, 178 and 180 all assume the set state.

Since the drive motor 44 has inertia, it may not be necessary to provide flip flop 174 and one-shot 194. Instead, the measurement reference could be stored the instant the zero position limit switch is closed. Measurement, however, will not begin until the motor has reversed and driven away from the limit switch.

The setting of flip-flop 176 causes the drive motor 44 of the FIG. 2 to commence driving the vacuum chamber 34 away from the sample holder 12 so as to scan the fiber sample 10.

The setting of flip-flop 178 activates the up-counter 140 in the length measurement and recording unit of FIG. 6 since the "1" output of flip-flop 178 forms one of the inputs to AND-gate 142 in FIG. 6. Similarly, setting flip-flop 178 activates the second up-counter 146 of FIG. 6 since its "1" output form one of the inputs to AND-gate 144.

Thus, flip-flop 176 commences the scanning operation by causing the driver motor 44 to move the vacuum chamber 34. At the same time, the up-counters 140, 146 in the length measurement and recording unit are activated by flip-flops 178, 180, respectively.

Flip-flop 178 remains set until such time as the predetermined percentage of fibers are present at the scan line. At this point, the output of comparator 32 in FIG. 4 goes to a logic "1." Since this signal is fed to the "R" input terminal of flip-flop 178, flip-flop 178 will then reset thereby inhibiting AND-gate 142 and storing the span length of that predetermined percentage in the up-counter 140 of FIG. 6.

Since flip-flop 176 remains set, however, the vacuum chamber 34 continues to move and scan the fiber sample until such time as the output of the additional comparator (not shown) of FIG. 4 indicates that the second predetermined percentage has been reached. At this point, flip-flop 180 will reset thereby inhibiting AND-gate 144 and storing the second span length in up-counter 146 of FIG. 6.

Since flip-flop 176 remains set, the vacuum chamber continues to move until such time as the end position limit switch 70 of FIG. 2 indicates the end of the measurement cycle.

When the end position limit switch 70 indicates the end of the measurement cycle, flip-flop 176 resets, stopping drive motor 44. The output of the end position limit switch 70 is also fed to the "S" input terminal of flip-flop 182 so that flip-flop 182 sets at the end of the measurement cycle. Setting flip-flop 182 activates the zero check circuit 91 of FIG. 3 and the Hi-Lo check circuit 29 of FIG. 4. These circuits perform the accuracy checks as explained above. If the intensity of the light source, the sample size and the sample configuration are appropriate, the outputs of the zero check circuit 91 and Hi-Lo check circuit 28 are both logic "1." These outputs form the inputs to an AND-gate 198. The output of AND-gate 198 will then go to a logic "1" indicating that the measurements taken are proper and can be recorded. The output of AND-gate 198 is fed to the "R" input terminal of flip-flop 182 causing flip-flop 182 to reset. The output of AND-gate 198 is also fed to the "S" input terminal of flip-flop 184 causing it to resume the set state. When flip-flop 184 sets, its "1" output is fed to the print logic 152 of FIG. 6 which activates the print logic and causes the information stored in the up-counters 140, 146 to be recorded by the printer 154.

The "1" output of flip-flop 184 also forms the input to a one-shot 200. After the predetermined delay of the one-shot 200, its output will go to a logic "1." This output is fed to the "R" input terminal of flip-flop 184 so that flip-flop 184 will reset after the predetermined time delay. The time delay of one-shot 200 need only be sufficiently long to allow the print logic 152 and the printer 154 to record the accumulated information. Resetting flip-flop 184 indicates the end of the measurement cycle. The sample can then be removed from the measurement instrument, and a new sample inserted into the instrument and the measurement cycle begun anew.

Although specific embodiments of the invention have been illustrated and described in detail, it is recognized that various alterations and modifications will be evident to persons skilled in the art. It is intended, therefore, that the foregoing description be considered as exemplary only and that the scope of the invention be ascertained from the following claims.

I claim:

1. A measuring instrument for determining fiber length information comprising:
   a. means for holding a substantially planar sample of parallelized fibers;
   b. means for sensing the number of fibers at a transverse cross section through the fiber sample;
   c. an analog-to-digital converter including a clock pulse generator and a reversible pulse counter operatively connected to said generator and to said sensing means for generating a digital signal which is proportional to the number of fibers in said cross section;
   d. a memory storage operatively connected to said analog-to-digital converter for storing an output signal therefrom as a measurement reference;
   e. driving means for causing relative motion between said holding means and said sensing means in a direction parallel to the length of the fibers in said sample so as to scan said sample;
   f. accumulation means responsive to the relative motion between said sensing and holding means to accumulate a measure of said motion;
   g. a divider operatively connected to said memory storage for generating an output signal proportional to a predetermined percentage of the measurement reference;
   h. a comparator operatively connected to said divider and to said analog-to-digital converter for generating an electrical output signal when the outputs of said divider and said analog-to-digital converter are substantially equal; and
   i. recording means responsive to the output signal from said comparator for recording the contents, at the time when the outputs of said divider and said analog-to-digital converter become substantially equal, of said accumulation means.

2. The measuring instrument recited in claim 1 further comprising a sequencer for establishing and controlling the measurement cycle.

3. The measuring instrument recited in claim 2 further comprising means operatively connected to said sequencer prior to the commencement of a measurement cycle an when no fibers are affecting the output of said sensing means for adjusting said sensing means to bring the output thereof to a predetermined value.

4. The measuring instrument recited in claim 3 further comprising means for checking the output of said sensing means at the end of the measuring cycle after the relative motion between said holding means and said sensing means has proceeded to a point where no fibers of a normal sample would affect the output of said sensing means but where some fibers from a defective sample could affect such output, and means for generating a signal when the checked output of said sensing means is not within predetermined limits.

5. The measuring instrument recited in claim 1 further comprising sample check means operatively connected to said storage means for verifying that the sample is within predetermined physical limits.

6. The measuring instrument as recited in claim 1 further comprising means for establishing a zero position relatively near the grip line of said holding means, the output of said zero position means being operatively connected to said memory storage to transfer the output of said analog-to-digital converter to said memory storage to act as the measurement reference.

7. The measuring instrument as recited in claim 1 wherein said means for sensing comprises a radiation source for radiating the sample and a radiation detector for receiving the radiation which passes through said sample.

8. The measuring instrument recited in claim 7 wherein said radiation source comprises a light source and said radiation detector comprises a photocell.

9. The measuring instrument as recited in claim 8 further comprising means for setting the intensity of said light source a the beginning of said measurement cycle.

10. The measuring instrument as recited in claim 9 further comprising means for checking the intensity of said light source at the end of said measurement cycle.

11. The measuring instrument recited in claim 8 further comprising checking means operatively connected to said memory storage for verifying that said sample is within predetermined physical limits.

12. The measuring instrument recited in claim 8 further comprising a first light pipe for transmitting the output of said light source to said sample and a second light pipe for transmitting the light which passes through said sample to said photocell.

13. The measuring instrument recited in claim 1 wherein said means for holding said sample includes a vacuum chamber having an aperture therein whereby said sample extends into said aperture and is held substantially straight by the difference in atmospheric pressure.

14. The measuring instrument recited in claim 13 wherein said sensing means comprises a light source for radiating said sample and a photocell for receiving the light rays passing through said sample, said light source and said photocell being mounted on said vacuum chamber so as to establish a scan line at said aperture of said vacuum chamber.

15. The measuring instrument recited in claim 14 wherein said fiber sample is held stationary and said driving means comprises means for moving said vacuum chamber.

16. The measuring instrument recited in claim 15 further comprising an encoder coupled to said driving means for indicating the motion thereof, the output of said encoder forming the input to said accumulation means.

17. A measuring instrument for determining fiber length information comprising:
 a. means for holding a substantially planar sample of parallelized fibers;
 b. means for sensing the number of fibers at a transverse cross section through the fiber sample, such means including a radiation source for radiating the sample and the radiation detector for receiving the radiation which passes through the sample;
 c. an analog-to-digital converter operatively connected to said sensing means for generating a digital signal which is proportional to the number of fibers in said cross section, said analog-to-digital converter comprising
  a. a comparator having a first and a second input, said first input being operatively connected to the output of said radiation detector,
  b. a reversible counter operatively connected to said comparator, said comparator being operative to control the direction in which said counter counts, and
  c. a complex digital-to-analog function generator having its digital input connected to said reversible counter and its analog output connected to said second input of said comparator;
 d. a memory storage operatively connected to said analog-to-digital converter for storing an output signal therefor as a measurement reference;
 e. driving means for causing relative motion between said holding means and said sensing means in a direction parallel to the length of the fibers in said sample so as to scan said sample;
 f. accumulation means responsive to the relative motion between said sensing and holding means to accumulate a measure of said motion;
 g. a divider operatively connected to said memory storage for generating an output signal proportional to a predetermined percentage of the measurement reference;
 h. a comparator operatively connected to said divider and to said analog-to-digital converter to generate an output signal when the outputs of said divider and said analog-to-digital converter are substantially equal; and,
 i. recording means responsive to the output signal from said comparator to record the contents of said accumulation means.

18. The measuring instrument recited in claim 17 wherein said complex digital-to-analog function generator comprises:
 a. first and second digital-to-analog converters each having a high reference analog voltage input $E_0$, a low reference analog voltage input $E_i$, a digital input $D$ and an analog voltage output $V$ where $V=D(E_o-E_i)+E_i$;
 b. said first digital-to-analog converter having said high reference analog voltage input connected to a first reference voltage and to the output of a voltage divider connected to the analog voltage output of said second digital-to-analog converter, said low reference analog voltage input connected to a second reference voltage, and said digital input connected to the output of said reversible counter; and
 c. said second digital-to-analog converter having said high reference voltage input connected to the analog voltage output of said first digital-to-analog converter, said low reference voltage input connected to a third reference voltage source, and said digital input connected to the output of said reversible counter whereby the analog voltage output of said second digital-to-analog converter forms the output of said complex digital-to-analog function generator.

19. The measuring instrument recited in claim 1 wherein said memory storage includes a digital-to-analog converter and said divider includes a voltage divider operatively connected to the output of said digital-to-analog converter in said memory storage.

20. A measuring instrument for determining fiber length information comprising:
 a. a light source;
 b. a photocell;
 c. a vacuum chamber for holding a substantially planar sample of parallelized staple fibers between and at right angles to the scan line of said light source and said photocell;
 d. an analog-to-digital converter operatively connected to said photocell for generating a digital signal which is proportional to the output of said photocell;
 e. a first memory storage operatively connected to said analog-to-digital converter for storing an output signal therefrom as a measurement reference;
 f. driving means for moving said vacuum chamber at right angles to the scan line so as to scan the fiber sample;
 g. an encoder operatively connected to said vacuum chamber for indicating the amount of motion thereof;
 h. digital storage means operatively connected to said encoder for storing the output thereof;
 i. a divider operatively connected to said first memory storage, said divider being operative to generate an output signal which is proportional to a predetermined percentage of the measurement reference stored in said first memory storage;
 j. a comparator operatively connected to the outputs of said divider and said analog-to-digital converter, said comparator being operative to generate an output signal when said outputs are substantially equal; and
 k. recording means responsive to an output signal from said comparator to record the contents of said digital storage means.

21. A method of determining fiber length information comprising the steps of:
 a. placing a substantially planar sample of parallelized fibers in a first, fixed position;
 b. sensing the number of fibers in a transverse cross section through the sample;

c. generating a first digital signal indicative of the number of fibers present in said cross section at said first position;
d. initiating relative movement between said fiber sample and the sensing position parallel to the fiber length;
e. generating a second digital signal indicative of the amount of said relative motion;
f. continually sensing the transverse cross section of the sample during said relative movement so as to scan said sample;
g. generating a third digital signal as a result of the scanning, the third digital signal being proportional to the number of fibers in the cross section being sensed;
h. generating from said first digital signal a fourth signal which is a predetermined percentage of the first digital signal;
i. comparing the third and fourth signals until they are substantially equal; and
j. recording the value of the second digital signal at the time said third and fourth signals become equal so as to indicate the span length of a predetermined percentage of the fibers in the sample.

22. A method of determining fiber information comprising steps of:
a. placing a substantially planar sample of parallelized fibers in a first position between and at right angles to a source of radiation and a radiation detector;
b. generating first digital signal which is a function of the output of the radiation detector when the sample is in said first position, the first digital signal being indicative of the number of fibers present in the sample at the first position;
c. initiating a relative motion between said sample and radiation source and motion;
e. generating a third digital signal which is continually proportional to the number of fibers presently between the radiation source and detector;
f. generating from said first digital signal a fourth signal which is a predetermined percentage of the first digital signal;
g. comparing the third and fourth signals until they are substantially equal; and
h. recording the value of the second digital signal at the time said third and fourth signals become equal so as to indicate the span length of a predetermined percentage of the fibers in the sample.

23. The method as recited in claim 22 comprising the additional step of setting the intensity of the radiation source prior to placing the sample between said radiation source and detector.

24. The method recited in claim 23 comprising the additional step of checking the intensity of the radiation source prior to the step of recording and inhibiting the step of recording if said intensity is not within predetermined limits.

25. A method of determining fiber information comprising the steps of:
a. placing a substantially planar sample of parallelized fibers in a first position between and at right angles to a source of radiation and a radiation detector;
b. generating a first digital signal which is a function of the output of the radiation detector when the sample is in said first position, the first digital signal being indicative of the number of fibers present in the sample at the first position;
c. initiating relative motion between said sample and radiation source and detector;
d. generating a second digital signal indicative of the amount of said relative motion;
e. generating a third digital signal which is continually proportional to the number of fibers presently between the radiation source and detector;
f. generating a fourth signal which is a predetermined percentage of the first digital signal;
g. comparing the third and fourth signals until they are substantially equal;
h. recording the second digital signal so as to indicate the span length of a predetermined percentage of the fibers in the sample;
i. loading the third digital signal into a memory storage prior to placing the sample between radiation source and detector; and
j. setting the intensity of the radiation source according to the contents of the memory storage prior to placing the sample between said radiation source and detector.

26. A method of determining fiber information comprising the steps of:
a. placing a substantially planar sample of parallelized fibers in a first position between and at right angles to a source of radiation and a radiation detector;
b. generating a first digital signal which is a function of the output of the radiation detector when the sample is in said first position, the first digital signal being indicative of the number of fibers present in the sample at the first position;
c. initiating relative motion between said sample and radiation source and detector;
d. generating a second digital signal indicative of the amount of said relative motion;
e. generating a third digital signal which is continually proportional to the number of fibers presently between the radiation source and detector;
f. generating a fourth signal which is a predetermined percentage of the first digital signal;
g. comparing the third and fourth signals until they are substantially equal;
h. recording the second digital signal so as to indicate the span length of a predetermined percentage of the fibers in the sample;
i. generating a fifth digital signal indicative of the maximum permissible size of the fiber sample;
j. generating a sixth digital signal indicative of the minimum permissible size of the fiber sample;
k. comparing the first digital signal with the fifth and sixth digital signals; and
l. inhibiting the step of recording if the first digital signal does not fall within the range established by the fifth and sixth digital signals.